United States Patent
Ogiwara et al.

(10) Patent No.: US 11,939,723 B2
(45) Date of Patent: Mar. 26, 2024

(54) PAPERMAKING FELT AND METHOD FOR MANUFACTURING THE SAME

(71) Applicant: Ichikawa Co., Ltd., Tokyo (JP)

(72) Inventors: Yasuyuki Ogiwara, Bunkyo-ku (JP); Yuto Muraoka, Bunkyo-ku (JP)

(73) Assignee: Ichikawa Co., Ltd., Tokyo (JP)

( * ) Notice: Subject to any disclaimer, the term of this patent is extended or adjusted under 35 U.S.C. 154(b) by 786 days.

(21) Appl. No.: 17/029,155

(22) Filed: Sep. 23, 2020

(65) Prior Publication Data

US 2021/0095423 A1    Apr. 1, 2021

(30) Foreign Application Priority Data

Sep. 27, 2019   (JP) .................................. 2019-176941

(51) Int. Cl.
   *D21F 7/10*   (2006.01)
   *B29C 65/00*  (2006.01)
   *D06H 5/00*   (2006.01)

(52) U.S. Cl.
   CPC ............ *D21F 7/10* (2013.01); *B29C 66/1122* (2013.01); *B29C 66/4324* (2013.01); *B29C 66/4329* (2013.01); *B29C 66/729* (2013.01); *D06H 5/005* (2013.01)

(58) Field of Classification Search
   CPC ........ D21F 7/10; D21F 1/0054; D21F 1/0072; D21F 1/0081; D21F 7/08; B29C 66/1122; B29C 66/4324; B29C 66/4329; B29C 66/729; B29C 5/08; B29C 66/80; D06H 5/005

See application file for complete search history.

(56) References Cited

U.S. PATENT DOCUMENTS

| | | | |
|---|---|---|---|
| 5,713,399 A | 2/1998 | Collette et al. | |
| 6,880,583 B2* | 4/2005 | Billings | D21F 1/0054 139/383 AA |
| 7,794,555 B2* | 9/2010 | LaFond | B29C 65/08 156/64 |
| 8,801,880 B2* | 8/2014 | LaFond | B29C 66/73521 428/102 |
| 10,179,975 B2* | 1/2019 | Botelho | D21F 7/10 |

(Continued)

FOREIGN PATENT DOCUMENTS

| | | | | |
|---|---|---|---|---|
| EP | 3798358 A1 * | 3/2021 | ......... | B29C 66/1122 |
| EP | 3196357 B1 * | 9/2021 | ............... | D03D 1/00 |

(Continued)

*Primary Examiner* — Jose A Fortuna
(74) *Attorney, Agent, or Firm* — Oblon, McClelland, Maier & Neustadt, L.L.P.

(57) ABSTRACT

A papermaking felt includes at least one base fabric composed of a MD yarn material in the felt running direction (MD) and a CD yarn material in the felt crossing direction (CD) and having MD end regions and CD end regions, at least one of the MD end regions and the CD end regions are overlapped with each other, the entire overlapped portion is welded without removing a part or all of the MD yarn material or the CD yarn material in the overlapped portion, and when the average thickness of the welded portion of each base fabric is x (mm) and the average thickness of the material portion of each base fabric is y (mm), the relationship between x and y of the at least one base fabric satisfies the following formula (1):

$0.5 \leq x/y \leq 0.95$.

14 Claims, 2 Drawing Sheets

(56) References Cited

U.S. PATENT DOCUMENTS

| | | |
|---|---|---|
| 2006/0016571 A1 | 1/2006 | Silakoski |
| 2009/0061151 A1 | 3/2009 | LaFond et al. |
| 2021/0095423 A1* | 4/2021 | Ogiwara ............... D21F 1/0072 |
| 2022/0064857 A1* | 3/2022 | Ogiwara ................ D21F 7/083 |

FOREIGN PATENT DOCUMENTS

| | | | | |
|---|---|---|---|---|
| EP | 3960932 A1 | * | 3/2022 | ............. D21F 7/083 |
| JP | 10-226978 A | | 8/1998 | |
| JP | 2006-510812 A | | 3/2006 | |
| JP | 2010-538179 A | | 12/2010 | |
| JP | 2022038303 A | * | 3/2022 | ............. D21F 7/083 |

* cited by examiner

PAPERMAKING FELT AND METHOD FOR MANUFACTURING THE SAME

TECHNICAL FIELD

The present invention relates to a papermaking felt and a method for manufacturing the same.

BACKGROUND TECHNOLOGY

A papermaking machine that removes water from raw material of paper is generally equipped with a wire part, a press part and a dryer part. The wire part, the press part and the dryer part are arranged in this order along the transfer direction of a wet paper web. The wet paper web having a certain width is transferred like a belt in the papermaking machine in a direction (CD direction: cross machine direction) perpendicular to the traveling direction (MD direction: machine direction) of the papermaking machine, during which it is received by papermaking tools attached to each of the wire part, the press part and the dryer part while water is squeezed; and the wet paper web is finally dried in the dryer part.

A press device arranged in the press part includes a plurality of press devices arranged in series along the wet paper web transfer direction. Each press device has an endless felt, or an endless felt formed by connecting felts with ends on the papermaking machine, and has a pair of rolls arranged such that they are vertically opposed to each other to sandwich apart of each of said felts therebetween (that is, a roll press), or a roll and a cylindrical belt that includes a shoe (that is, a shoe press); and a wet paper web transferred by a felt traveling in the same direction at approximately the same speed and the felt are pressed/pressurized together, either by the roll and the roll, or by the roll and the cylindrical belt including the shoe, thereby water is continuously removed from said wet paper web.

Required functions of the felt used in a press device include dewatering property, smoothness, running stability and the like. Dewatering means removing water contained in a wet paper web. In order to fulfill this function, it is important that the felt has excellent compression recovery characteristics; that is, when the felt is not pressed, the felt has a space (void volume) for removal of water, and when the felt is pressed, the density of the felt is maximized and the volume of this space is reduced, thereby releasing the water outside the felt. It is also important that dewatering property is maintained during the use of the felt, and that the removed water does not return to the wet paper web (prevention of rewetting).

Smoothness means smoothness of the wet paper web surface and the felt surface (including the felt surface under pressure). Since the wet paper web is pressed through the felt, the state of the felt surface is transferred to the wet paper web surface. Therefore, in order to smooth the surface of the wet paper web, the felt surface (including the felt surface under pressure) must be smoothed.

Running stability means that the endless felt arranged in a press device runs stably without breakage, deviation, meandering, and vibration, waviness, etc.

There are various types of paper, such as newspaper, high-quality paper, paperboard, household paper, etc., and there are also various types of papermaking machines that manufacture them. At present, various types of papermaking felts are manufactured according to these papers and papermaking machines. Generally, this felt is made by integrating a batt layer of non-woven fiber material with a base fabric layer. The base fabric layer may be, for example, a woven fabric composed of a monofilament yarn, a monofilament twisted yarn, a multifilament yarn or a multifilament twisted yarn, and the woven fabric may be a single weave or a multiple weave, or a laminated structure in which these are laminated. As said yarn, the following is generally used: any synthetic polymeric resins used by those skilled in the papermaking arts for this purpose such as polyamide resin or polyester resin which are extrusion-molded, animal fibers such as wool, plant fibers such as cotton, hemp, etc.

There are various kinds of woven fabrics as the above-mentioned base fabric layer, and for example, they are woven so as to be endless on a weaving machine (hollow weave), or end regions of a plain woven fabric are sewn together to make endless woven fabric; there is also an endless woven fabric in which two ends in the cross machine direction or the machine direction are connected to each other.

Among these, the base fabric layer (papermaking felt) manufactured by the hollow weaving has excellent smoothness because it has a continuous surface with no seam. However, because each papermaking machine has different dimensions, corresponding base fabric layers need to be perfectly made to order. For this reason, in order to manufacture the base fabric layer by hollow weaving, it is necessary to change the setting of the weaving machine finely every time the dimension is changed, resulting in very poor productivity and poor yield.

On the other hand, as an efficient method for manufacturing a papermaking felt, the following method has been proposed (JP A No. 2006-510812): the end regions in the MD direction of a base fabric are overlapped with each other and joined by pressing, so that the overlapped portion substantially corresponds to the thickness of the other portions. Specifically, in order to make the overlapped portion in the MD direction of the base fabric substantially correspond to the thickness of the other portions, the following embodiment is disclosed: the horizontal yarns are removed from one of the base fabrics of the overlapped portion to reduce the density of the horizontal yarn.

In addition, as another efficient method for manufacturing a papermaking felt, the following method has been proposed (JP A No. H10-226978): the end regions in the CD direction of a base fabric are overlapped with each other and joined by welding, so that the overlapped portion substantially corresponds to the thickness of the other portions. Specifically, the following embodiment is disclosed: the base fabric in a belt-like state is wound in a spiral shape, and in order to make the overlapped portion in the CD direction of the base fabric substantially correspond to the thickness of the other portions, the longitudinal yarns are removed from at least one of the base fabrics of the overlapped portion to form fringes.

CITATION LIST

Patent Document

[Patent Document 1] JP A No. 2006-510812
[Patent Document 2] JP A No. H10-226978

SUMMARY OF INVENTION

Problems to Be Solved by Invention

The papermaking felts obtained by the manufacturing methods disclosed in the above prior art can be manufactured efficiently, but the required functions of papermaking felt, particularly the smoothness, have not always been sufficiently satisfied. In particular, the welded portion disclosed in the prior art is poor in compressibility relative to the material portion, and upon manufacture of base fabric, when the thicknesses of the welded portion and the material portion (including the non-welded portion around the welded portion) are made equal, then the mark of the welded portion (base fabric mark) might be remarkably generated with the felt under pressure.

Therefore, the object of the present invention is to provide a papermaking felt which is excellent in smoothness of the joined portion (no welded portion mark or base fabric mark is generated), and an efficient manufacturing method thereof.

Means for Solving Problems

As a result of intensive studies, the present inventors have found that the problems of the present invention can be solved by reducing the thickness of the welded portion compared to the thickness of the material portion, so as to make the thickness of the welded portion equal to the thickness of the material portion (thickness of the non-welded portion) under pressure.

(1) A papermaking felt wherein, in at least one base fabric composed of a MD yarn material in the felt running direction (MD direction) and a CD yarn material in the felt crossing direction (CD direction) and having an MD-direction end region consisting of a first MD-direction end region and a second MD-direction end region and a CD-direction end region consisting of a first CD-direction end region and a second CD-direction end region, at least one of the MD-direction end regions and the CD-direction end regions are overlapped with each other, and said overlapped portion is welded without removing a part or all of the MD yarn material or the CD yarn material in said overlapped portion, and wherein, when the average thickness of the welded portion of each base fabric is x (mm) and the average thickness of each base fabric before welding is y (mm), the relationship between x and y of the at least one base fabric satisfies the following formula (1):

$$0.5 \leq x/y \leq 0.95 \tag{1}$$

(2) The papermaking felt according to (1), wherein, when the average thickness of the welded portion is x (mm) and the average thickness before welding is y (mm), the relationship between x and y of the at least one base fabric satisfies the following formula (2):

$$0.6 \leq x/y \leq 0.8 \tag{2}$$

(3) The papermaking felt according to (1) or (2), wherein the first MD-direction end region and the second MD-direction end region of one base fabric are overlapped with each other, and said overlapped portion is welded without removing a part or all of the CD yarn material in said overlapped portion.

(4) The papermaking felt according to (1) or (2), wherein the first MD-direction end region and the second MD-direction end region of two or more base fabrics are overlapped with each other, and said overlapped portions are welded without removing a part or all of the CD yarn material in said overlapped portions.

(5) The papermaking felt according to (1) or (2), wherein the first MD-direction end region and the second MD-direction end region of two or more base fabrics are overlapped with each other and the first CD-direction end region and the second CD-direction end region of said two or more base fabrics are overlapped with each other, and said overlapped portions are welded without removing a part or all of the CD yarn material or the MD yarn material in said overlapped portions.

(6) The papermaking felt according to (1) or (2), wherein the first CD-direction end region and the second CD-direction end region of one base fabric are overlapped with each other, and said overlapped portion is welded without removing a part or all of the MD yarn material in said overlapped portion.

(7) The papermaking felt according to (1) or (2), wherein the first CD-direction end region and the second CD-direction end region of two or more base fabrics are overlapped with each other, and said overlapped portions are welded without removing apart or all of the MD yarn material in said overlapped portions.

(8) The papermaking felt according to any one of (1) to (7), wherein the overlap margin (MD-direction length) when the MD-direction end regions are overlapped with each other or the overlap margin (CD-direction length) when the CD-direction end regions are overlapped with each other is 1.0 mm to 3.0 mm.

(9) The papermaking felt according to any one of (1) to (8), wherein the welding width (MD-direction length) when the MD-direction end regions are overlapped with each other and the overlap margin is welded, or the welding width (CD-direction length) when the CD-direction end regions are overlapped with each other and the overlap margin is welded, is 1.0 mm to 5.0 mm.

(10) The papermaking felt according to any one of (1) to (9), wherein at least one of the MD yarn material or the CD yarn material of at least one base fabric is a thermoplastic resin having a heat resistant temperature of 60° C. to 200° C. and a melting point of 80° C. to 300° C.

(11) The papermaking felt according to any one of (1) to (10), wherein the weight per unit area of at least one base fabric is 100 g/m² to 500 g/m².

(12) A method for manufacturing a papermaking felt, comprising:

(a) a step wherein, in a base fabric composed of a MD yarn material in the felt running direction (MD direction) and a CD yarn material in the felt crossing direction (CD direction) and having an MD-direction end region consisting of a first MD-direction end region and a second MD-direction end region and a CD-direction end region consisting of a first CD-direction end region and a second CD-direction end region, at least one of the MD-direction end regions and the CD-direction end regions are overlapped with each other, (b) a step wherein the entire overlapped portion in step (a) is welded without removing a part or all of the MD yarn material or the CD yarn material in said overlapped portion, and the overlapped end regions are joined such that, when the average thickness of the welded portion of each base fabric is x (mm) and the average thickness of each base fabric before welding is y (mm), the relationship between x and y satisfies the following formula (1):

$$0.5 \leq x/y \leq 0.95 \tag{1}$$

(c) a step wherein steps (a) and (b) are repeated as necessary to form at least one base fabric into a closed loop shape.

(13) The manufacturing method according to (12), comprising, in step (b), when the average thickness of the welded portion is x (mm) and the average thickness before welding is y (mm), a step of joining the overlapped end regions such that the relationship between x and y satisfies the following formula (2):

$$0.6 \leq x/y \leq 0.8 \quad (2)$$

(14) A papermaking felt manufactured by the method according to (12) or (13).

Advantageous Effects of Invention

With the above configuration, it is possible to provide a papermaking felt which is excellent in smoothness of a joined portion (no welded portion marks and base fabric marks are generated), and an efficient manufacturing method thereof.

EMBODIMENT FOR CARRYING OUT THE INVENTION

Hereinafter, embodiments of the base fabric for papermaking felt of the present invention and the method for manufacturing the same will be described with reference to the drawings; however, the present invention is not limited thereto.

Here, all technical and scientific terms used herein have the same meaning as commonly understood by one of ordinary skill in the art, unless otherwise defined herein. All patents, applications and other publications referenced herein (including information available from the internet) are hereby incorporated by reference in their entirety.

The base fabric used for papermaking felt of the present invention is composed of MD yarn material in the felt running direction (MD direction) and CD yarn material in the felt crossing direction (CD direction).

Figure 1:
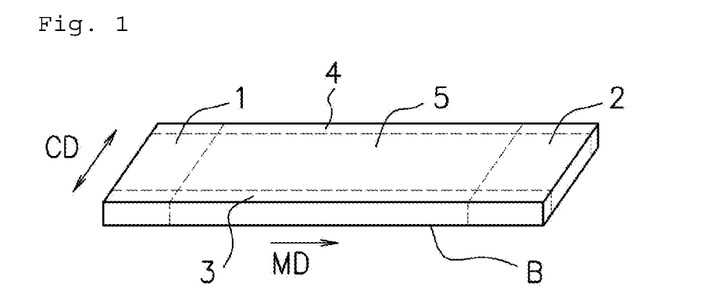
FIG. 1 is a schematic view of a base fabric of the present invention.

The MD/CD directions in the base fabric (in a state having ends) are shown by the arrows (MD/CD) in FIG. 1, and when the papermaking felt is used in a papermaking machine, the MD direction is defined as the moving direction of the felt (rotational direction), and the CD direction as the direction crossing the moving direction of the felt (rotational direction). As shown in FIG. 1, the base fabric has a first MD-direction end region 1, a second MD-direction end region 2, a first CD-direction end region 3, a second CD-direction end region 4, and a central region 5 surrounded by the first/second MD-direction end regions and the first/second CD-direction end regions.

The papermaking felt of the present invention is a papermaking felt wherein, in at least one base fabric composed of a MD yarn material in the felt running direction (MD direction) and a CD yarn material in the felt crossing direction (CD direction) and having an MD-direction end region consisting of a first MD-direction end region and a second MD-direction end region and a CD-direction end region consisting of a first CD-direction end region and a second CD-direction end region, at least one of the MD-direction end regions and the CD-direction end regions are overlapped with each other, and said overlapped portion is welded without removing a part or all of at least either one of the MD yarn material or the CD yarn material in said overlapped portion, and said papermaking felt comprises the base fabric wherein, when the average thickness of the welded portion of each base fabric is x (mm) and the average thickness of each base fabric before welding is y (mm), the end regions are joined such that the relationship between x and y of the at least one base fabric satisfies the following formula (1):

$$0.5 \leq x/y \leq 0.95 \quad (1)$$

Here, x shows the average thickness of all the welded portions in one base fabric, and y shows the average thickness of said base fabric before welding. In the papermaking felt of the present invention, when only one base fabric is used, the base fabric satisfies the relationship of the above formula (1), and when a plurality of base fabrics are used, x/y is calculated for each base fabric and at least one base fabric satisfies the above formula (1).

The papermaking felt of the present invention comprises a portion in which the MD-direction end regions and/or the CD-direction end regions of the base fabric are welded to each other, and it is characterized in that the average thickness of the welded portion is 50% or more and 95% or less, preferably 60% or more and 80% or less of the average thickness before welding; that is, the above formula (1), preferably the following formula (2) is satisfied.

$$0.6 \leq x/y \leq 0.8 \quad (2)$$

As a result, when the felt is used (under pressure), thickness of the welded port ion and that of the non-welded portion become equal, and smoothness of the felt improves (no welded portion marks and base fabric marks are generated), so that smoothness of the paper improves. This is because compressibility of the welded portion is lower than that of the non-welded portion.

In addition, since the papermaking felt of the present invention includes a configuration in which removal of MD yarn material or CD yarn material in the overlapped portion is not necessary, the papermaking felt can be efficiently manufactured without the necessity of this removal step.

The papermaking felt of the present invention may be manufactured by joining one base fabric, or may be manufactured by joining two or more base fabrics.

Specific embodiments of the papermaking felt of the present invention include the following embodiments (a) to (e).

(a) A papermaking felt, wherein the first MD-direction end region and the second MD-direction end region of one base fabric are overlapped with each other, and said overlapped portion is welded without removing a part or all of the CD yarn material in said overlapped portion.

(b) A papermaking felt, wherein the first MD-direction end region and the second MD-direction end region of two or more base fabrics are overlapped with each other, and said overlapped portions are welded without removing a part or all of the CD yarn material in said overlapped portions.

(c) A papermaking felt, wherein the first MD-direction end region and the second MD-direction end region of two or more base fabrics are overlapped with each other and the first CD-direction end region and the second CD-direction end region of said two or more base fabrics are overlapped with each other, and said overlapped portions are welded without removing a part or all of the CD yarn material or the MD yarn material in said overlapped portions.

(d) A papermaking felt, wherein the first CD-direction end region and the second CD-direction end region of one base fabric are overlapped with each other, and said overlapped portion is welded without removing a part or all of the MD yarn material in said overlapped portion.

(e) A papermaking felt, wherein the first CD-direction end region and the second CD-direction end region of two or more base fabrics are overlapped with each other, and said overlapped portions are welded without removing a part or all of the MD yarn material in said overlapped portions.

Figure 2:
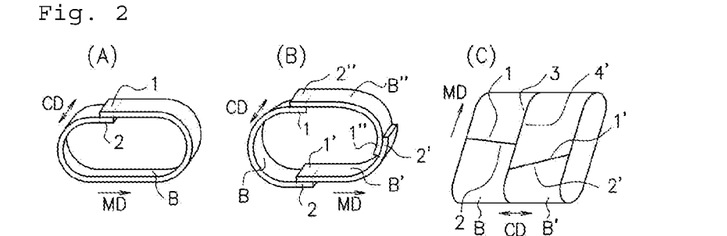
FIG. 2 is a schematic view of at least one base fabric in the shape of a closed loop, which is formed in a manufacturing process of the present invention.

When manufacturing a papermaking felt by joining one base fabric, for example as shown in FIG. 2 (A), the first MD-direction end region 1 and the second MD-direction end region of the base fabric B can be overlapped and joined.

Figure 3:
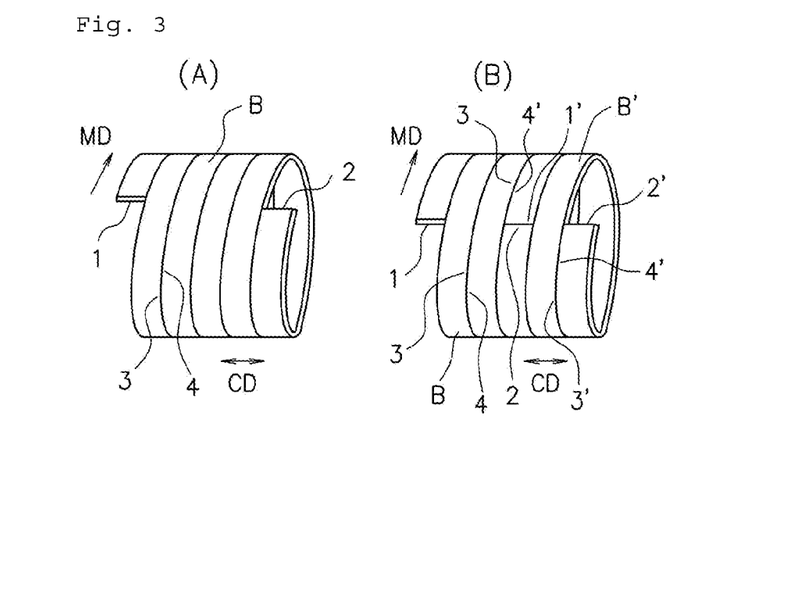
FIG. 3 is a schematic view of at least one base fabric in the shape of a closed loop, which is formed in a manufacturing process of the present invention.

In addition, as shown in FIG. 3(A), the base fabric B is spirally wound, and the first CD-direction end region 3 and the second CD-direction end region 4 of the base fabric B can be overlapped and joined.

When manufacturing a papermaking felt by joining two or more base fabrics, for example, when manufacturing a papermaking felt by joining three base fabrics B, B', and B" as shown in FIG. 2(B), the second MD-direction end region 2 of the base fabric B and the first MD-direction end region 1' of the base fabric B', the second MD-direction end region 2' of the base fabric B' and the first MD-direction end region 1" of the base fabric B", the second MD-direction end region 2" of the base fabric B" and the first MD-direction end region 1 of the base fabric B, respectively, can be overlapped and joined.

Furthermore, as shown in FIG. 2(C), when manufacturing a papermaking felt by joining two base fabrics B and B', the first MD-direction end region 1 and the second MD-direction end region 2 of the base fabric B can be overlapped and joined, and the first MD-direction end regions 1' and the second MD-direction end regions 2' of the base fabric B' can be overlapped and joined, and the first CD-direction end region 3 of the base fabric B and the second CD-direction end region 4' of the base fabric B' can be overlapped and joined.

Moreover, as shown in FIG. 3(B), when manufacturing a papermaking felt by spirally winding and joining two base fabrics B and B', the first CD-direction end region 3 and the second CD-direction end region 4 of the base fabric B can be overlapped and joined, and the second MD-direction end region 2 of the base fabric B and the first MD-direction end region 1' of the base fabric B' can be overlapped and joined, and the first CD-direction end region 3 of the base fabric B and the second CD-direction end region 4' of the base fabric B' can be overlapped and joined, and the first CD-direction end region 3' of the base fabric B' and the second CD-direction end region 4' of the base fabric B' can be overlapped and joined.

Overlap margin when overlapping MD-direction ends together or CD-direction ends together (when overlapping MD-direction ends together, it means the length in the MD direction to be overlapped; when overlapping CD-direction ends together, it means the length in the CD direction to be overlapped) is preferably 1.0 mm or more and 3.0 mm or less, and the joining width (welding width) after joining (after welding) is preferably the overlap margin or more and 5.0 mm or less. When the overlap margin is smaller than 1.0 mm, the joining width (welding width) may be reduced depending on the joining condition (welding condition), and the strength after joining may not be sufficiently maintained.

When the overlap margin is larger than 3.0 mm, depending on the joining condition (welding condition), the joining width becomes larger than 5.0 mm, and there is a possibility that a problem in surface smoothness (generation of welded portion marks or base fabric marks) may occur.

In the present specification, the term "joining" means that all of the MD-direction end regions that are overlapped with each other and/or all of the CD-direction end regions that are overlapped with each other are welded to each other to generate a state wherein said overlapped end regions are fixed. In addition, it also encompasses a state wherein, during welding, a part of the welding material in the overlapped portion comes out of the overlapped portion, so that the periphery of the overlapped portion is also fixed; in this case, the welding width becomes larger than the overlap margin.

As a constituent material of fibers constituting the MD yarn material and the CD yarn material, it is preferable to use a thermoplastic resin having a heat resistant temperature of 60° C. to 200° C. and a melting point of 80° C. to 300° C. For example, polyethylene resin, polypropylene resin, polystyrene resin, acrylic resin, polyethylene terephthalate resin, polyamide resin, acetal resin, polycarbonate resin and the like can be used as the MD yarn material and the CD yarn material, among which the polyamide resin is preferred.

The form of fibers constituting the MD yarn material and the CD yarn material includes monofilament, multifilament, spun yarn, textured yarn such as crimped textured yarn and bulk textured yarn, etc., finished yarn such as bulky yarn and stretch yarn, etc., and furthermore, twisted yarns formed by twisting these yarns can be used. The cross-sectional shape of fibers can be circular, substantially elliptical, polygonal, substantially star-shaped, substantially rectangular, or the like.

The fineness of fibers constituting the MD yarn material and the CD yarn material is not particularly limited; in the case of monofilament, it maybe preferably 89 to 2240 dtex (0.10 to 0.50 mm), more preferably 200 to 1440 dtex (0.15 to 0.40 mm). In the case of multifilament, the fineness of a monofilament constituting the multifilament is usually 20 to 90 dtex, preferably 40 to 60 dtex. The number of fibers constituting the multifilament is usually 5 to 20, preferably 7 to 15. When these yarns are twisted to form a twisted yarn, the number of these yarns is usually 2 to 15, preferably 3 to 10.

The MD yarn material and the CD yarn material that constitute the base fabric may be only one type or two or more types.

The base fabric may have either a single weave structure or a multiple weave structure, and the weaving pattern is not particularly limited; for example, other weaves such as plain weave, twill weave, satin weave and modified weave, etc., and any combinations thereof may be used.

Weight per unit area of the base fabric is not particularly limited, and it can be usually 100 to 500 g/m$^2$, and preferably 150 to 400 g/m$^2$. Thickness of the base fabric is not particularly limited, and it can be usually 0.4 to 1.3 mm, preferably 0.6 to 1.1 mm. Density of the base fabric is not particularly limited, and it can be usually 0.25 to 0.55 g/cm$^3$, and preferably 0.35 to 0.45 g/cm$^3$. The density of the base fabric is determined by dividing the weight per unit area of the base fabric by the thickness of the base fabric; when this density is too low, the energy during welding is difficult to be transferred to the yarn material, which may cause poor welding; in addition, when the density is too high, the energy at the time of welding becomes insufficient, which may also cause poor welding.

Dimension of the base fabric is not particularly limited; it may be any dimension as long as the dimension of the final product (papermaking felt) in which the ends of the base fabric are overlapped and welded is satisfactory.

Figure 4:
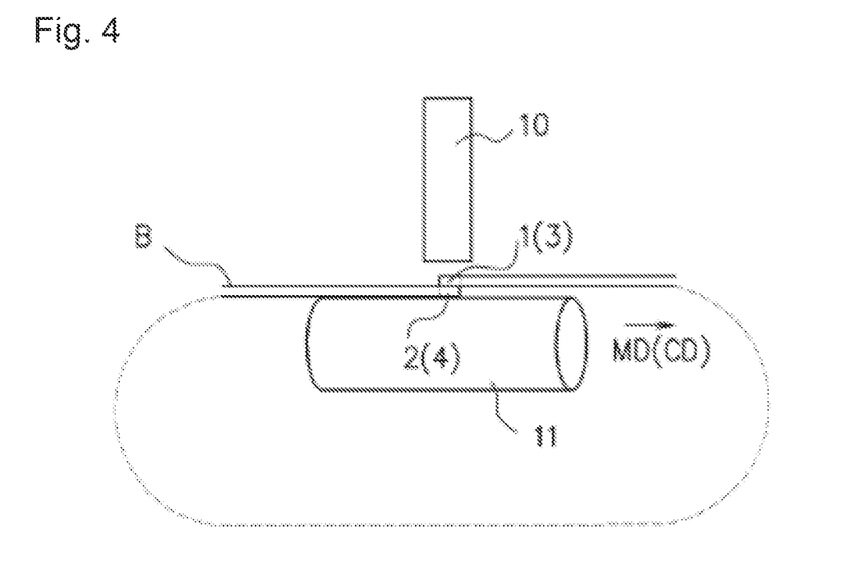
FIG. 4 is a schematic view showing a welding method of the present invention.

The method for welding a base fabric is not particularly limited, but it is preferable to use ultrasonic welding provided with a horn 10 and an anvil 11 as shown in FIG. 4, for example. The overlapped portion of the base fabric is placed between the horn 10 and the anvil 11, ultrasonic waves are emitted from the horn 10, the horn 10 is directed toward the anvil 11 to apply pressure, and the base fabric is moved in the direction along the overlapped portion, and thereby, the overlapped portion of the base fabric is welded.

For example, when the first MD-direction end region 1 and the second MD-direction end region 2 of one base fabric are welded by the ultrasonic welding of FIG. 4, the joined base fabric which includes a dotted line portion becomes endless.

The papermaking felt of the present invention comprises a welded portion in the base fabric, and is characterized in that the average thickness of the welded portion is 50% or more and 95% or less, preferably 60% or more and 80% or less of the average thickness before welding, that is, the above formula (1), preferably the above formula (2) is satisfied; this can be achieved by appropriately setting the welding condition (ultrasonic energy, distance between horn and anvil (gap), horn pressure, feed speed of the base fabric, length of the overlapped portion of the base fabric (overlap margin of the base fabric)).

Figure 5:
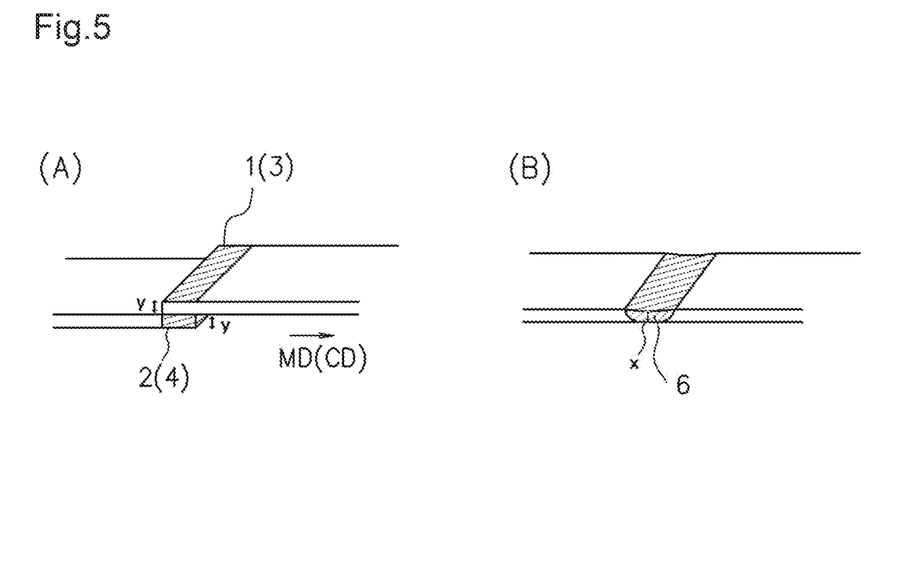
FIG. 5 is a schematic view showing an embodiment of welding of a base fabric of the present invention.

As shown in FIG. 5(A) (before welding) and FIG. 5(B) (after welding), the welded portion 6 comprises at least all the overlapped portions of the base fabric, and the welding is preferably carried out linearly such that the welding width and the welding thickness respectively are substantially constant; by means of which the strength of the welded portion is maintained, and the surface smoothness is excellent (welded portion marks and base fabric marks are not generated).

The method for welding overlapped portions of the base fabric is not particularly limited, and examples thereof include ultrasonic welding, high frequency welding, and heat welding, etc. When ultrasonic welding is used, and when pressure is applied to an overlapped portion of the base fabric by a horn, the ultrasonic energy is transferred particularly to this overlapped portion because the density of the overlapped portion is high. Therefore, even if the horn width is larger than the width of the overlap margin of the base fabric, the welding is not promoted at the horn edge portion beyond the overlapped portion.

Furthermore, the present invention also relates to a method for manufacturing a papermaking felt, comprising:
(a) a step wherein, in a base fabric composed of a MD yarn material in the felt running direction (MD direction) and a CD yarn material in the felt crossing direction (CD direction) and having an MD-direction end region consisting of a first MD-direction end region and a second MD-direction end region and a CD-direction end region consisting of a first CD-direction end region and a second CD-direction end region, at least one of the MD-direction end regions and the CD-direction end regions are overlapped with each other,
(b) a step wherein the entire overlapped portion in step (a) is welded without removing a part or all of the MD yarn material or the CD yarn material in said overlapped portion, and the overlapped end regions are joined such that, when the average thickness of the welded portion of each base fabric is x (mm) and the average thickness of each base fabric before welding is y (mm), the relationship between x and y satisfies the following formula (1):

$$0.5 \leq x/y \leq 0.95 \quad (1)$$

(c) a step wherein steps (a) and (b) are repeated as necessary to form at least one base fabric into a closed loop shape.

The manufacturing method of the present invention preferably comprises, in step (b), when the average thickness of the welded portion is x (mm) and the average thickness before welding is y (mm), a step of joining the overlapped end regions such that the relationship between x and y satisfies the following formula (2):

$$0.6 \leq x/y \leq 0.8 \quad (2)$$

Furthermore, the present invention also relates to a papermaking felt manufactured by the above manufacturing method.

EXAMPLE

Hereinafter, the base fabric for papermaking felt of the present invention will be described in detail with reference to examples; however, these examples do not limit the present invention in any way.

The base fabrics of Examples 1 to 5 and Comparative Examples 1 and 2 were manufactured using the MD yarn material and CD yarn material shown below. The MD-direction ends of the manufactured base fabrics were welded under the welding conditions shown in Table 1. Welding was performed using an ultrasonic welder with a horn width of 5 mm (rectangular parallelepiped shape, no rotating mechanism) and an anvil width of 30 mm (cylindrical shape, with rotating mechanism).

Table 2 shows the welding width of the welded portion after welding, the welded portion thickness x, the material portion thickness y, the ratio of the welded portion thickness to the material portion thickness x/y, the marking index, and the strength.

MD yarn material: monofilament single yarn of polyamide 6 with a fiber diameter 550 dtex
  100 yarns/5 cm
CD yarn material: monofilament single yarn of polyamide 6 with a fiber diameter 500 dtex
  40 yarns/5 cm
Weave structure: twill weave (31 broken), single weave
Weight per unit area: 200 g/m$^2$
Thickness before welding (material portion thickness): 0.63 mm
Base fabric dimensions: length (MD direction) 3 m×width (CD direction) 1 m

TALE 1

| | Gap (mm) | Horn pressure (MPa) | Base fabric feed speed (m/min) | Base fabric overlap margin (mm) |
|---|---|---|---|---|
| Ex. 1 | 0.08 | 0.25 | 0.60 | 1.7 |
| Ex. 2 | 0.00 | 0.22 | 0.40 | 1.7 |
| Ex. 3 | 0.00 | 0.17 | 0.40 | 1.7 |
| Ex. 4 | 0.00 | 0.11 | 0.40 | 1.7 |
| Ex. 5 | 0.34 | 0.22 | 0.40 | 2.4 |
| Comp. Ex. 1 | 0.42 | 0.22 | 0.40 | 2.4 |
| Comp. Ex. 2 | 0.38 | 0.22 | 0.40 | 2.4 |

TALE 2

|  | Welding width (mm) | Welded portion thickness x (mm) | Material portion thickness y (mm) | x/y (%) | Marking index (%) | Strength (N/5 cm) |
|---|---|---|---|---|---|---|
| Ex. 1 | 5.0 | 0.31 | 0.63 | 49 | 44 | 276 |
| Ex. 2 | 2.5 | 0.38 | 0.63 | 60 | 39 | 410 |
| Ex. 3 | 1.7 | 0.42 | 0.63 | 67 | 44 | 450 |
| Ex. 4 | 1.7 | 0.49 | 0.63 | 78 | 61 | 405 |
| Ex. 5 | 2.4 | 0.57 | 0.63 | 90 | 83 | 252 |
| Comp. Ex. 1 | 2.4 | 0.63 | 0.63 | 100 | 100 | 92 |
| Comp. Ex. 2 | 3.0 | 0.66 | 0.63 | 105 | 111 | 53 |

The base fabrics of Examples 6 to 10 and Comparative Examples 3 and 4 were manufactured using the MD yarn material and CD yarn material shown below. The MD-direction ends of the manufactured base fabrics were welded under the welding conditions shown in Table 3. Welding was performed using an ultrasonic welder with a horn width of 5 mm (rectangular parallelepiped shape, no rotating mechanism) and an anvil width of 30 mm (cylindrical shape, with rotating mechanism).

Table 4 shows the welding width of the welded portion after welding, the welded portion thickness x, the material portion thickness y, the ratio of the welded portion thickness to the material portion thickness x/y, the marking index, and the strength.

MD yarn material: monofilament twisted yarn in which two monofilament single yarns of polyamide 6 with a fiber diameter 330 dtex are twisted, then two of said twisted yarns are again twisted.
35 yarns/5 cm
CD yarn material: monofilament twisted yarn in which three monofilament single yarns of polyamide 6 with a fiber diameter 330 dtex are twisted.
40 yarns/5 cm
Weave structure: plain weave (11 plain), single weave
Weight per unit area: 250 g/m$^2$
Material portion thickness: 0.82 mm
Base fabric dimensions: length (MD direction) 3 m×width (CD direction) 1 m

TALE 3

|  | Gap (mm) | Horn pressure (MPa) | Base fabric feed speed (m/min) | Base fabric overlap margin (mm) |
|---|---|---|---|---|
| Ex. 6 | 0.16 | 0.33 | 0.20 | 1.7 |
| Ex. 7 | 0.19 | 0.33 | 0.25 | 1.7 |
| Ex. 8 | 0.28 | 0.33 | 0.25 | 1.7 |
| Ex. 9 | 0.39 | 0.33 | 0.25 | 1.7 |
| Ex. 10 | 0.45 | 0.33 | 0.25 | 2.4 |
| Comp. Ex. 3 | 0.54 | 0.33 | 0.25 | 2.4 |
| Comp. Ex. 4 | 0.65 | 0.33 | 0.25 | 2.4 |

TALE 4

|  | Welding width (mm) | Welded portion thickness x (mm) | Material portion thickness y (mm) | x/y (%) | Marking index (%) | Strength (N/5 cm) |
|---|---|---|---|---|---|---|
| Ex. 6 | 1.7 | 0.43 | 0.82 | 52 | 19 | 512 |
| Ex. 7 | 2.5 | 0.51 | 0.82 | 62 | 23 | 602 |
| Ex. 8 | 2.5 | 0.57 | 0.82 | 70 | 38 | 656 |
| Ex. 9 | 2.0 | 0.66 | 0.82 | 80 | 62 | 649 |
| Ex. 10 | 3.0 | 0.77 | 0.82 | 94 | 88 | 497 |
| Comp. Ex. 3 | 3.0 | 0.82 | 0.82 | 100 | 100 | 300 |
| Comp. Ex. 4 | 3.0 | 0.90 | 0.82 | 110 | 115 | 61 |

The marking index in Tables 2 and 4 shows an evaluation of surface smoothness. The evaluation method is performed as follows: a needled batt layer (fineness: 22 dtex, 100 g/m$^2$) is placed on a base fabric having a welded portion, and carbon paper and PPC paper are further placed on the batt layer, then the resulting base fabric is passed between two rolls (pressure between the rolls: 50 kgf/cm) so that the mark of the welded portion (base fabric mark) is transferred to the PPC paper; evaluation is performed by increasing the number of batt layers in a unit of 100 g/m$^2$ until this mark of the welded portion (base fabric mark) cannot be confirmed any more. This indicates that under certain pressure, the smaller the weight per unit area of the batt layer placed on the base fabric, the better the marking property (surface smoothness).

In Examples 1 to 5 and Comparative Examples 1 and 2, the weight per unit area of the batt layer of 1800 g/m$^2$ at which the welded portion mark (base fabric mark) in Comparative Example 1 could not be confirmed was set to 100%, and in Examples 6 to 10 and Comparative Examples 3 and 4, the weight per unit area of the batt layer of 2600 g/m$^2$ at which the welded portion mark (base fabric mark) in Comparative Example 3 could not be confirmed was set to 100%, and relative evaluation was performed respectively.

The strength in Tables 2 and 4 means a breaking strength when a base fabric with a length of 30 cm and a width of 5 cm sampled such that the welded portion is parallel to the width direction in the central region of the length direction, has been stretched at 200 mm/min in the length direction.

As can be seen from the tables, it is understood that the marking index is improved and the surface smoothness of the papermaking felt is improved by setting the thickness of the welded portion to 50% to 95% of the thickness of the material portion. In addition, it is understood that since the MD yarn material or the CD yarn material in the end regions is not removed in the welded portions, the density of the welded portions becomes high, and therefore the strength of the Examples is higher than that of the Comparative Examples.

EXPLANATION OF SYMBOLS

B, B', B" Base fabric
1, 1', 1" First MD-direction end region
2, 2', 2" Second MD-direction end region
3, 3' First CD-direction end region
4, 4' Second CD-direction end region
5 Central region (material portion)
6 Welded portion
10 Horn
11 Anvil

The invention claimed is:

1. A papermaking felt wherein, in at least one base fabric composed of a MD yarn material in the felt running direction (MD) and a CD yarn material in the felt crossing direction (CD) and having an MD end region consisting of a first MD end region and a second MD end region and a CD end region consisting of a first CD end region and a second CD end region, at least one of the MD end regions and the CD end regions are overlapped with each other, and said entire overlapped portion is welded without removing a part or all of the MD yarn material or the CD yarn material in said overlapped portion, and wherein, when the average thickness of the welded portion of each base fabric is x (mm) and the average thickness of the material portion of each base fabric is y (mm), the relationship between x and y of the at least one base fabric satisfies the following formula (1):

$$0.5 \leq x/y \leq 0.95 \qquad (1).$$

2. The papermaking felt according to claim 1, wherein, when the average thickness of the welded portion is x (mm) and the average thickness the material portion is y (mm), the relationship between x and y of the at least one base fabric satisfies the following formula (2):

$$0.6 \leq x/y \leq 0.8 \qquad (2).$$

3. The papermaking felt according to claim 1, wherein the first MD end region and the second MD end region of one base fabric are overlapped with each other, and said entire overlapped portion is welded without removing a part or all of the CD yarn material in said overlapped portion.

4. The papermaking felt according to claim 1, wherein the first MD end region and the second MD end region of two or more base fabrics are overlapped with each other, and said entire overlapped portions are welded without removing a part or all of the CD yarn material in said overlapped portions.

5. The papermaking felt according to claim 1, wherein the first MD end region and the second MD end region of two or more base fabrics are overlapped with each other and the first CD end region and the second CD end region of said two or more base fabrics are overlapped with each other, and said entire overlapped portions are welded without removing a part or all of the CD yarn material or the MD yarn material in said overlapped portions.

6. The papermaking felt according to claim 1, wherein the first CD end region and the second CD end region of one base fabric are overlapped with each other, and said entire overlapped portion is welded without removing a part or all of the MD yarn material in said overlapped portion.

7. The papermaking felt according to claim 1, wherein the first CD end region and the second CD end region of two or more base fabrics are overlapped with each other, and said entire overlapped portions are welded without removing a part or all of the MD yarn material in said overlapped portions.

8. The papermaking felt according to claim 1, wherein the overlap margin (MD length) when the MD end regions are overlapped with each other or the overlap margin (CD length) when the CD end regions are overlapped with each other is 1.0 mm to 3.0 mm.

9. The papermaking felt according to claim 1, wherein the welding width (MD length) when the MD end regions are overlapped with each other and the overlap margin is welded, or the welding width (CD length) when the CD end regions are overlapped with each other and the overlap margin is welded, is 1.0 mm to 5.0 mm.

10. The papermaking felt according to claim 1, wherein at least one of the MD yarn material or the CD yarn material of at least one base fabric is a thermoplastic resin having a heat resistant temperature of 60° C. to 200° C. and a melting point of 80° C. to 300° C.

11. The papermaking felt according to claim 1, wherein the weight per unit area of at least one base fabric is 100 g/m$^2$ to 500 g/m$^2$.

12. A method for manufacturing a papermaking felt, comprising:
(a) a step wherein, in a base fabric composed of a MD yarn material in the felt running direction (MD) and a CD yarn material in the felt crossing direction (CD) and having an MD end region consisting of a first MD end region and a second MD end region and a CD end region consisting of a first CD end region and a second CD end region, at least one of the MD end regions and the CD end regions are overlapped with each other,
(b) a step wherein the entire overlapped portion in step (a) is welded without removing a part or all of the MD yarn material or the CD yarn material in said overlapped portion, and the overlapped end regions are joined such that, when the average thickness of the welded portion of each base fabric is x (mm) and the average thickness of the material portion of each base fabric is y (mm), the relationship between x and y satisfies the following formula (1):

$$0.5 \leq x/y \leq 0.95 \qquad (1)$$

(c) a step wherein steps (a) and (b) are repeated as necessary to form at least one base fabric into a closed loop shape.

13. The manufacturing method according to claim 12, comprising, in step (b), when the average thickness of the welded portion is x (mm) and the average thickness of the material portion is y (mm), a step of, joining the overlapped end regions such that the relationship between x and y satisfies the following formula (2):

$$0.6 \leq x/y \leq 0.8 \qquad (2).$$

14. A papermaking felt manufactured by the method according to claim 12.

* * * * *